US005639566A

United States Patent [19]

Okamura et al.

[11] Patent Number: 5,639,566

[45] Date of Patent: Jun. 17, 1997

[54] MAGNETIC CORE

[75] Inventors: Masami Okamura; Takao Kusaka, both of Yokohama, Japan

[73] Assignee: Kabushiki Kaisha Toshiba, Kawasaki, Japan

[21] Appl. No.: 408,108

[22] Filed: Mar. 21, 1995

Related U.S. Application Data

[63] Continuation of Ser. No. 859,320, filed as PCT/JP91/01294 Sep. 27, 1991 published as WO92/06480 Apr. 16, 1992, abandoned.

[30] Foreign Application Priority Data

Sep. 28, 1990 [JP] Japan .................................... 2-256966

[51] Int. Cl.$^6$ .............................. G11B 5/66; H01F 27/24; H01F 3/00

[52] U.S. Cl. ..................... 428/692; 428/332; 428/694 R; 428/694 TM; 428/900; 336/213; 336/214; 336/219; 29/604; 29/605; 29/606; 29/607; 29/609

[58] Field of Search ................................ 428/694 R, 692, 428/900, 332, 694 TM; 336/213, 214, 219; 29/604, 605, 606, 607, 609

[56] References Cited

U.S. PATENT DOCUMENTS

| | | | |
|---|---|---|---|
| 5,072,205 | 12/1991 | Arakawa et al. | 336/213 |
| 5,083,366 | 1/1992 | Arakawa et al. | 29/605 |

FOREIGN PATENT DOCUMENTS

| | | |
|---|---|---|
| 0 086 485 | 8/1983 | European Pat. Off. . |
| 2 103 525 | 8/1972 | Germany . |
| 40 02 999 | 8/1990 | Germany . |
| 54820027 | 6/1977 | Japan . |
| 290746 | 11/1989 | Japan . |
| 277555 | 3/1990 | Japan . |
| 3124008 | 5/1991 | Japan . |

OTHER PUBLICATIONS

Yamada Kazuo et al., "Manufacture of Wound Core", Abstract, JP 12 08 822, Aug 22, 1989.

*Primary Examiner*—Leszek Kiliman
*Attorney, Agent, or Firm*—Foley & Lardner

[57] ABSTRACT

A magnetic core obtained by laminating or winding a magnetic material ribbon and an electrical insulating material wherein the magnetic core has the relationship of 0.5 a≦b<a in which the width of the magnetic material ribbon is "a", and the width of the electrical insulating material is "b".

16 Claims, 6 Drawing Sheets

MAGNETIC CORE

This application is a continuation of application Ser. No. 07/859,320, filed May 28, 1992, now abandoned, which is the National Stage of International Application PCT/JP91/01294, Sep. 27, 1991, published as WO92/06480 Apr. 16, 1992 which designated the United States.

TECHNICAL FIELD

The present invention relates to a magnetic core used in apparatuses such as pulse generators and transformers, and more particularly, to a magnetic core used in a large electric power such as a magnetic core for a high output pulse.

BACKGROUND ART

Magnetic pulse compression circuits adapted for generating a pulse having a high output and a short pulse duration have been used in pulse power source apparatuses used in lasers and particle accelerators. The magnetic pulse compression circuits compress a current pulse duration utilizing a saturation characteristic of a saturable magnetic core when the charge of a capacitor is shifted to a capacitor of a next stage.

An induction magnetic core of a linear accelerator essentially operates as a 1:1 transformer and accelerates a charged particle beam which passes through the central portion of the magnetic core by means of a voltage generated in a secondary gap.

Heretofore, as these magnetic cores for high output pulse there have been used magnetic cores wherein magnetic material ribbons such as iron-base amorphous alloy ribbons or cobalt-base amorphous alloy ribbons having characteristics such as high saturation magnetic flux density, a high squareness ratio of a magnetization curve and a low core loss and electrical insulating materials composed of a polymeric film such as a polyester film or polyimide film are alternately wound.

In such magnetic cores, an insulating property between magnetic material ribbons is important because the magnetic cores are used in high output pulse applications. Therefore in the prior art in order to ensure layer insulation between magnetic material ribbon edges, the electrical insulating materials and the magnetic material ribbons have been set so that the width of the electrical insulating materials is wider than the width of the magnetic material ribbons.

However, we have now found that the following problems pose in the magnetic cores wherein the width of the electrical insulating materials is wider than the width of the magnetic material ribbons in order to ensure layer insulation between magnetic material ribbons as described above.

That is, as shown in FIG. 2 which is a schematic view of a cross-section of the prior art magnetic core, the edges of an electrical insulating material 2 projects from the edges of a magnetic material ribbon 1. Further, in general the electrical insulating material 2 has a low heat conduction property and therefore the space between the projected portions of the electrical insulating material 2 can be a thermal insulation layer 3. Accordingly, an effect of cooling on the heat generation of magnetic cores in use, in other words, the heat generation of magnetic material ribbons is reduced and thus the temperature of the magnetic cores can rise. In general, while the magnetic cores are cooled by coolant such as air, insulating oils, and fluorine-containing inert liquids, the temperature rise of the magnetic cores can result in the reduction of the magnetic flux of the magnetic cores and the acceleration of secular change of characteristics and there is inevitably occurred a problem that specific functions are not obtained.

An object of the present invention is to solve the problems described above and provide a magnetic core having an excellent cooling characteristic.

DISCLOSURE OF INVENTION

A magnetic core of the present invention is a magnetic core obtainable by laminating or winding a magnetic material ribbon and an electrical insulating material wherein it has the relationship of $0.5a \leqq b < a$ in which the width of said magnetic material ribbon is "a", and the width of said electrical insulating material is "b".

BEST MODE FOR CARRYING OUT THE INVENTION

Figure 1:
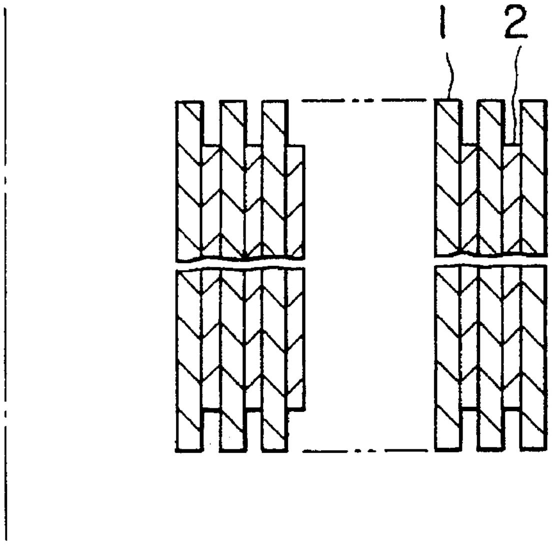
FIG. 1 is a schematic view showing the cross section of a magnetic core of the present invention.
Figure 2:
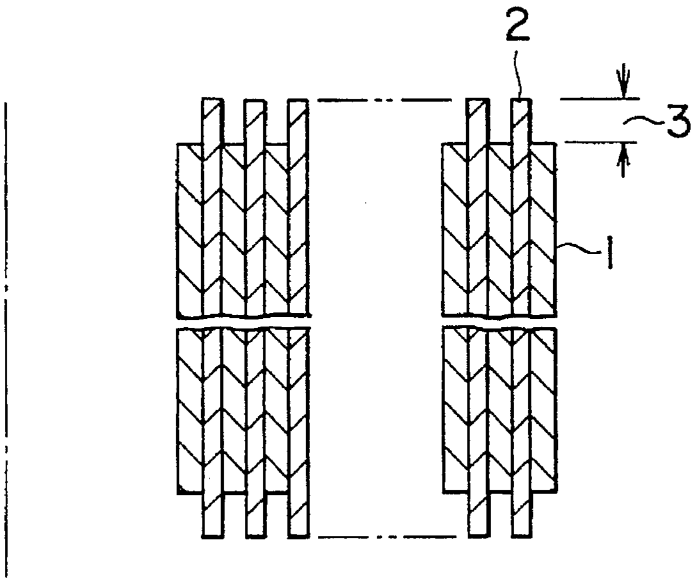
FIG. 2 is a schematic view showing the cross section of a magnetic core of the prior art.

In the present invention, as shown in FIG. 1, magnetic alloy ribbons project by using the width of electrical insulating materials 2 less than the width of magnetic material ribbons 1 and the contact area of the magnetic alloy ribbons 1 to a coolant is increased. A heat removal property of heat due to heat generation of magnetic cores in use, i.e., heat generation of the magnetic material ribbons is improved.

Accordingly, in order to improve contact area of magnetic material ribbon to coolant such as air, insulating oils, fluorine-containing inert liquids, the width "b" of an electrical insulating material must be less than the width "a" of a magnetic material ribbon. If the width is too narrow, the spacing between layers becomes narrow due to the deflection occurred when the thickness of the magnetic material ribbons is thin. When a high voltage is applied, a short-circuit is liable to be generated, and therefore the width "b" of the electrical insulating material is from 0.5 "a" to less than "a" for the width "a" of the magnetic material ribbon from the standpoint of short-circuit prevention. Preferably, the width "b" of the electrical insulating material is from 0.9 "a" to less than "a". More preferably, the width "b" of the electrical insulating material is from 0.95 "a" to less than "a". The larger the ratio of the thickness of the magnetic material ribbon to the thickness of the electrical insulating material, the larger an effect due to the difference in the widths of the magnetic material ribbon and electrical insulating material.

Further, in the present invention, as shown in FIG. 1, it is preferred that both edges in a width direction of the magnetic material ribbon 1 project from both edges in a width direction of the electrical insulating material 2.

The widths of the magnetic material ribbons and the electrical insulating materials in the case of magnetic cores obtained by laminating the magnetic material ribbons and the electrical insulating materials are ½ of the difference in outer diameter and inner diameter of each material.

Further, the reduction of layer insulation property in ribbon edges due to the fact that the width of the electrical insulating materials is less than the width of the magnetic alloy ribbon can be compensated by insulation property of coolant for magnetic cores such as air, insulating oils and fluorine-containing inert liquids present in ribbon edges. If necessary, an insulation property is further improved by increasing the thickness of the electrical insulating materials.

The material from which the magnetic material ribbon of the present invention is produced are not particularly limited provided that the magnetic material and the electrical insulating material can be laminated or wound to form magnetic cores. Of these, iron-base amorphous alloys, cobalt-base amorphous alloys or iron-base magnetic alloys obtained by crystallizing an iron-base amorphous alloy and depositing fine grains have excellent magnetic characteristics and therefore they are preferred.

Each magnetic material described above will be described in detail. First, iron-base amorphous alloys represented by the general formula:

$$Fe_{100-y}X_y[\text{at. \%}]$$

$$14 \leqq y \leqq 21$$

wherein X is one or more elements selected from Si, B, P, C and Ge have a high saturation magnetic flux density and therefore they are preferred. When X is Si or B, it is preferred that the amount of Si be from 7 to 14 at. %, and the amount of B be from 11 to 15 at. %. Of the iron-base amorphous alloys, iron-base amorphous alloys represented by the general formula:

$$(Fe_{1-x}M_x)_{100-y}X_y[\text{at. \%}]$$

$$0 < x \leqq 0.4$$

$$14 \leqq y \leqq 21$$

wherein M is one or two elements selected from Co and Ni, and X is one or more elements selected from Si, B, P, C and Ge and wherein a portion of Fe is substituted with Co and/or Ni are particularly preferred because high saturation magnetic flux density and high squareness ratio are obtained. In the iron-base amorphous alloys having the composition described above, magnetic characteristic can be improved by further adding not more than 5 at. % of elements such as Ti, Ta, V, Cr, Mn, Cu, Mo, Nb and W.

Further, cobalt-base amorphous alloys represented by the general formula:

$$(Co_{1-x}Fe_x)_{100-z}(Si_{1-y}B_y)_z$$

$$0.02 \leqq x \leqq 0.1$$

$$0.3 \leqq y \leqq 0.9$$

$$20 \leqq z \leqq 30$$

have a high squareness ratio and a low core loss and therefore they are particularly preferred. In the cobalt-base amorphous alloys having the composition described above, a magnetic characteristic can be further improved by further adding not more than 8 at. % of elements such as Ti, Ta, V, Cr, Mn, Cu, Mo, Nb and W. of these, Mn, Ni, Mo, and Nb are particularly preferred from the standpoint of a low core loss.

Preferred are the iron-base magnetic alloys obtained by crystallizing an iron-base amorphous alloy and depositing fine grains, for example, Fe-base soft magnetic alloys having the composition represented by the following general formula:

$$(Fe_{1-a}M_a)_{100-x-y-z-\alpha-\beta-\gamma}Cu_xSi_yB_zM^{-}{}_{\alpha}M^{=}{}_{\beta}X_{\gamma}$$

$$0 \leqq a \leqq 0.5$$

$$0.1 \leqq x \leqq 3$$

$$0 \leqq y \leqq 30$$

$$0 \leqq z \leqq 25$$

$$0 \leqq y+z \leqq 35$$

$$0.1 \leqq \alpha \leqq 30$$

$$0 \leqq \beta \leqq 10$$

$$0 \leqq \gamma \leqq 10$$

wherein M is one or two elements selected from Co and Ni, and $M^{-}$ is one or more elements selected from Nb, W, Ta, Zr, Hf, Ti and Mo, $M^{=}$ is one or more elements selected from V, Cr, Mn, Al, platinum group metals, Sc, Y, rare earth elements, Au, Zn, Sn and Re, and X is one or more elements selected from C, Ge, P, Ga, Sb, In, Be and As and wherein at least 50% of the texture is composed of fine grains, and the grains have a maximum grain size of not more than 500 Angstroms.

The amorphous alloy ribbons having the composition described above can be easily produced by applying, for example, methods such as a melt quenching method to alloys having a specific composition. Further, while the thickness of the magnetic material ribbon using these materials is not particularly limited, the thickness of the magnetic material ribbon is preferably, for example, from 3 to 40 μm and more preferably from 6 to 28 μm.

On the other hand, while the materials from which the electrical insulating material is produced are not particularly limited, polyester films are inexpensive and therefore they are preferred. Polyimide films have excellent heat-resistance and a polyimide film/magnetic material ribbon assembly can be heat treated and therefore, for example, magnetic material ribbons and polyimide films can be alternately wound or laminated and thereafter heat treated. Therefore the polyimide films are preferred. While the thickness of the electrical insulating material is not particularly limited, it is preferred that the thickness of the electrical insulating material be from 1.5 to 50 μm from the standpoint of the insulation property. More preferably, the thickness of the electrical insulating material is from 1.5 to 30 μm.

The magnetic core according to the present invention can be produced by the following process.

That is, magnetic material ribbons and electrical insulating materials having a specific composition and shape are alternately wound in a conventional method. Alternatively, the punched product obtained by punching magnetic material ribbons having a specific composition into a specific shape in a conventional method and electrical insulating materials are alternately laminated. Heat treatment is optionally applied. The magnetic characteristics such as squareness ratio of the resulting magnetic cores can be improved by heat treating in a direct-current or alternating-current magnetic field. When the cobalt-base amorphous alloys are used as the magnetic material ribbons, the composition capable of realizing a relatively high squareness ratio after melt quenching is present and therefore they can be used without applying any heat treatment.

Further, when the ribbons are heat treated in a direct-current or alternating-current magnetic field prior to the formation of magnetic cores, the squareness ratio of the resulting magnetic cores is improved as when a magnetic formed product is heat treated in a magnetic field. The size of the magnetic field is preferably of the order of 0.5 to 110 Oe and more preferably of the order of 5 to 20 Oe.

Further, combinations of the magnetic material ribbons and the electrical insulating materials can be appropriately selected depending upon required characteristics. For example, in uses wherein electrical insulating property is required, two or more layers of the electrical insulating material are used. In uses wherein magnetic characteristic is particularly required, two or more layers of the magnetic material ribbon can be used.

While the magnetic cores of the present invention are not limited provided that heat generation occurs in use in the magnetic cores wherein the magnetic material ribbons and the electrical insulating materials are alternately laminated or wound, they are particularly effective for magnetic cores used in a large electric power such as pulse generators and transformers used in lasers, particle accelerators and the like.

EXAMPLES 1 AND 2 AND COMPARATIVE EXAMPLES 1 AND 2

Amorphous alloy ribbons and electrical insulating materials having the compositions and shapes shown in Table 1 were used and they were alternately wound to form wound magnetic cores having an outer diameter of 200 mm and an inner diameter of 100 mm. The wound magnetic cores obtained were heat treated for 30 minutes at 420° C., and thereafter heat treated for 1 hour at a constant temperature of 200° C. in a direct-current constant magnetic field of 1 Oe.

EXAMPLE 3 AND COMPARATIVE EXAMPLE 3

Amorphous alloy ribbons and electrical insulating materials having the compositions and shapes shown in Table 1 were used and they were alternately wound to form wound magnetic cores having an outer diameter of 230 mm and an inner diameter of 100 mm. The wound magnetic cores obtained were heat treated for 30 minutes at 420° C., and thereafter heat treated for 1 hour at a constant temperature of 200° C. in a direct-current constant magnetic field of 1 Oe.

EXAMPLE 4 AND COMPARATIVE EXAMPLE 4

Amorphous alloy ribbons having the compositions and shapes shown in Table 1 were alternately wound to form wound magnetic cores having an outer diameter of 200 mm and an inner diameter of 100 mm. The wound magnetic cores obtained were heat treated for 2 hours at a constant temperature of 400° C. in a direct-current constant magnetic field of 1 Oe.

EXAMPLE 5 AND COMPARATIVE EXAMPLE 5

Only amorphous alloy ribbons having the compositions and shapes shown in Table 1 were alternately wound to form wound magnetic cores having an outer diameter of 180 mm and an inner diameter of 100 mm. The amorphous alloy ribbons were heat treated for 2 hours at a constant temperature of 320° C. in a direct-current constant magnetic field of 30 Oe. The amorphous alloy ribbons obtained and electrical insulating materials shown in Table 1 were used and they were alternately again wound to form wound magnetic cores having an outer diameter of 180 mm and an inner diameter of 100 mm.

EXAMPLE 6 AND COMPARATIVE EXAMPLE 6

Amorphous alloy ribbons and electrical insulating materials having the compositions and shapes shown in Table 1 were used and they were alternately wound to form wound magnetic cores having an outer diameter of 240 mm and an inner diameter of 100 mm. The wound magnetic cores obtained were heat treated for 1 hour at a constant temperature of 550° C. in a direct-current constant magnetic field of 1 Oe to crystallize amorphous alloys to deposit fine grains.

EXAMPLE 7 AND COMPARATIVE EXAMPLE 7

Amorphous alloy ribbons having the compositions and plate thicknesses shown in Table 1 were punched into annular products having an outer diameter of 60 mm and an inner diameter of 30 mm. The annular products obtained and annular electrical insulating materials having an outer diameter of 59.5 mm and an inner diameter of 30.5 mm were alternately laminated to form laminated magnetic cores having a height of 40 mm according to Example 7.

In Comparative Example, amorphous alloy ribbons having the compositions and plate thicknesses shown in Table 1 were punched into annular products having an outer diameter of 60 mm and an inner diameter of 30 mm. The annular products obtained and annular electrical insulating materials having an outer diameter of 61 mm and an inner diameter of 29 mm were alternately laminated to form laminated magnetic cores having a height of 40 mm according to Comparative Example 7.

Figure 3:
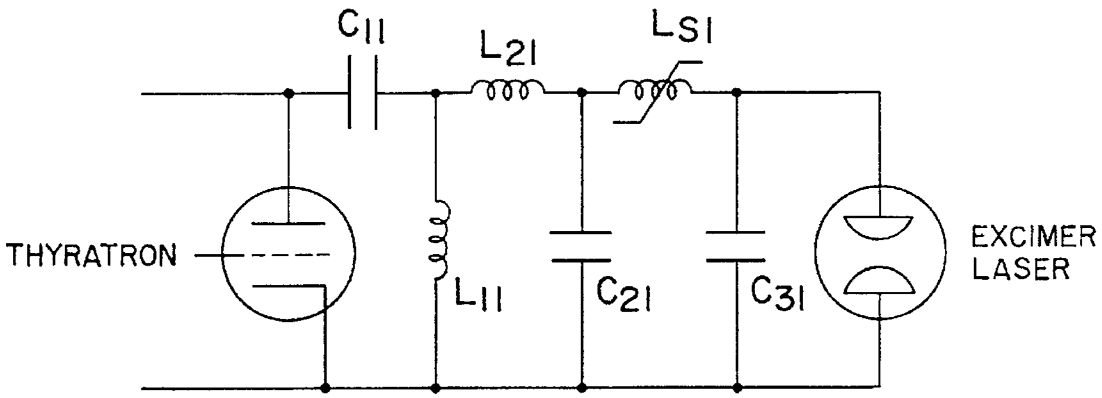
FIGS. 3 and 4 are circuit views showing an equivalent circuit of a KrF excimer laser system.

The magnetic cores of Examples 1, 4–6 and Comparative Examples 2, 4–6 were used in KrF excimer laser systems having an equivalent circuit of FIG. 3 whereupon the temperature rise of magnetic cores were measured. In this case, five magnetic cores were used in $L_{S1}$ to form an oil-cooled structure. $C_{11}$=20 nF, $C_{21}$=16 nF, $C_{31}$=14 nF, and $V_0$=30 kV. The repetitive frequency is 1 kHz in Examples 1 and 3 and Comparative Examples 1 and 3, and 0.2 kHz in Examples 4, 5 and 6 and Comparative Examples 4, 5 and 6.

The results are shown in Table 1.

Figure 4:
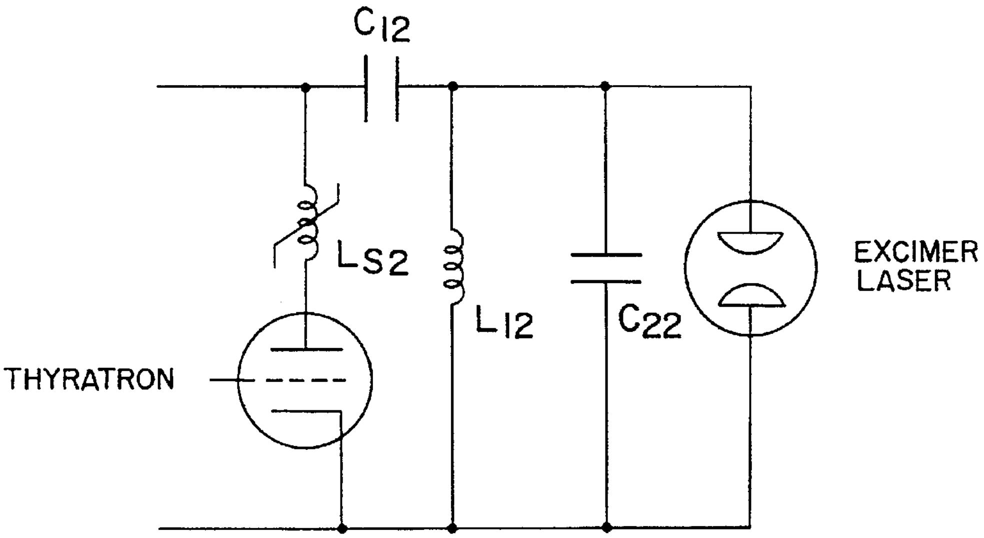

The magnetic cores of Examples 2 and 7 and Comparative Examples 2 and 7 were used in KrF excimer laser systems having an equivalent circuit of FIG. 4 whereupon the temperature rise of magnetic cores were measured. In this case, six magnetic cores were used in $L_{S2}$ to form a structure cooled by a fluorine-containing inert liquid. $C_{12}$=20 nF, $C_{22}$=16 nF, $V_0$=20 kV, and repetitive frequency=1 kHz. The results are also shown in Table 1.

As can be seen from Table 1 described hereinafter, the magnetic cores of the present invention wherein the width of the electrical insulating material is less than the width of magnetic material ribbons have small temperature rise of magnetic cores in use as compared with the prior magnetic cores wherein the width of the electrical insulating material is more than the width of the magnetic material ribbons. Even if the present magnetic cores are used as magnetic cores for high output pulse, they have an excellent cooling effect.

Further, magnetic cores were produced by varying the ratios of the width ($W_{IN}$) of the electrical insulating material and the width ($W_{AM}$) of the amorphous alloys ($W_{IN}/W_{AM}$), and they were used in a KrF excimer laser system having an equivalent circuit of FIG. 3. In this case, the temperature rise of the magnetic cores was measured. The results wherein the amorphous alloys and the electrical insulating materials are the same as those of Example 1 are shown in FIG. 5 and the results wherein the amorphous alloys and the electrical insulating materials are the same as those of Example 5 are shown in FIG. 6.

In this case, an oil-cooled structure was formed wherein 5 magnetic cores were in $L_{S1}$. $C_{11}$=20 nF, $C_{21}$=16 nF, $C_{31}$=14 nF, $V_0$=30 kV and repetitive frequency=1 kHz.

Figure 5:
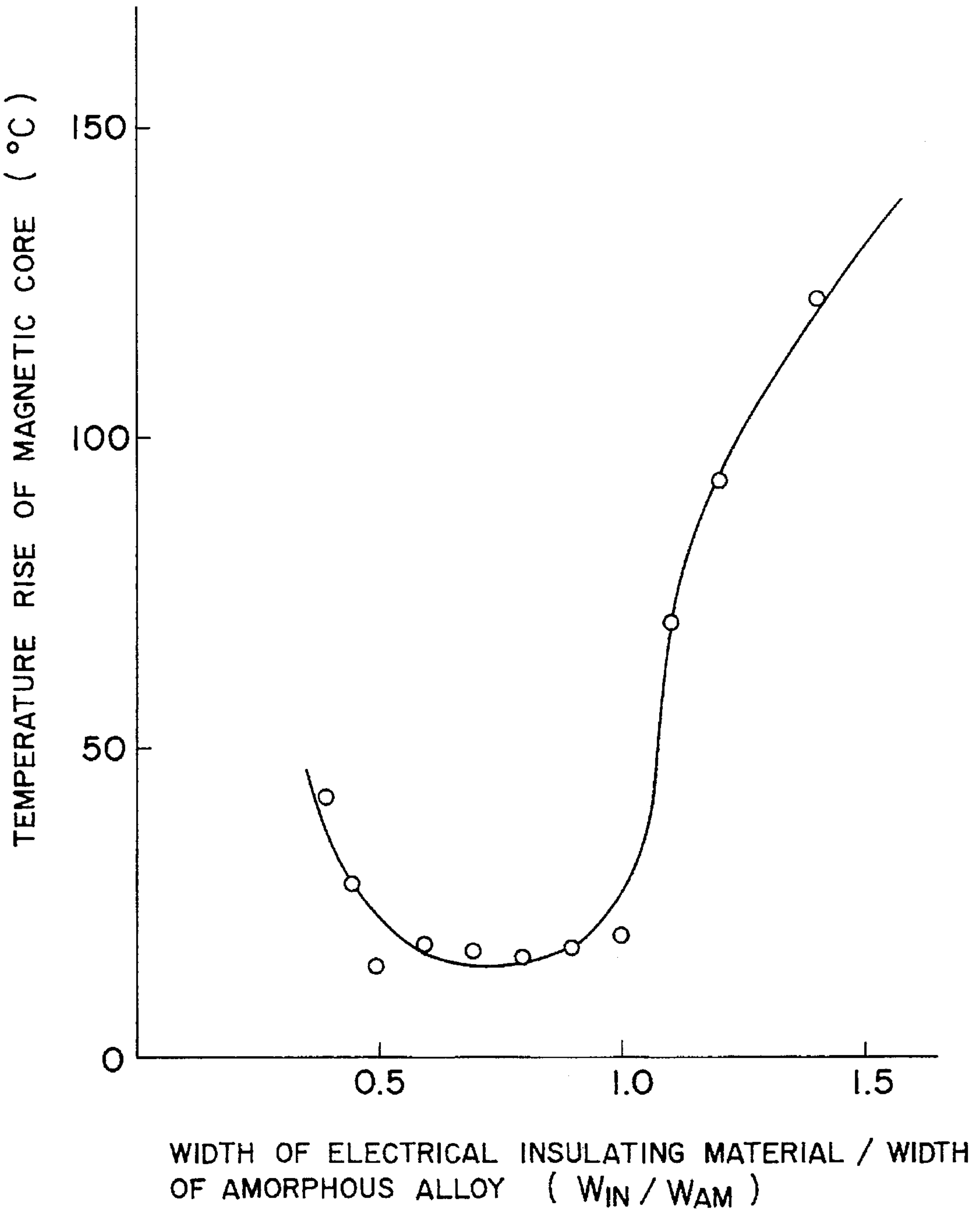
FIGS. 5 and 6 are graphs showing the temperature rise of magnetic cores wherein the ratios ($W_{IN}/W_{AM}$) of the width ($W_{IN}$) of electrical insulating materials to the width ($W_{AM}$) of amorphous alloys are varied.
Figure 6:
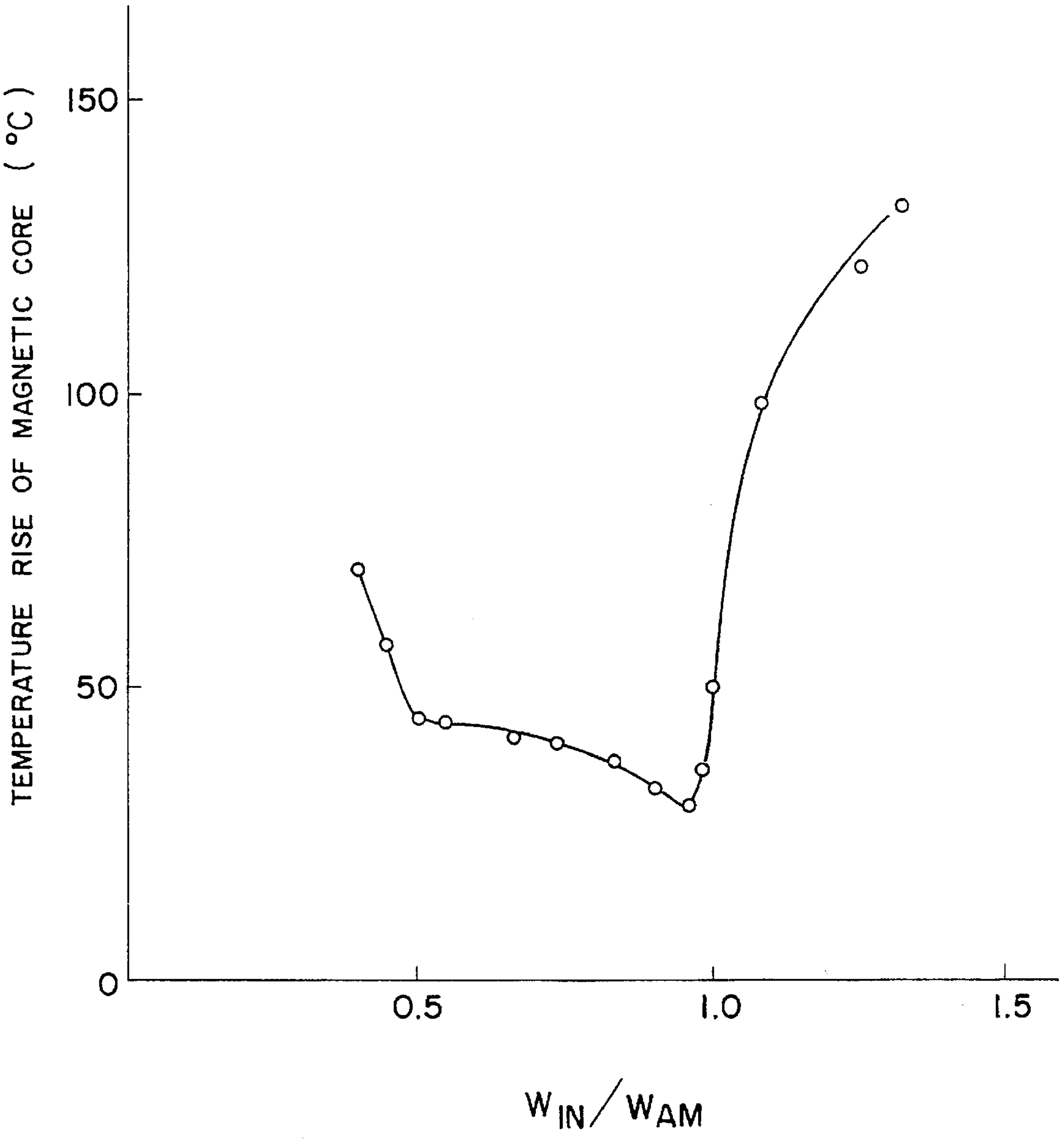

As can be seen from FIGS. 5 and 6, the magnetic cores wherein the ratio of the width ($W_{IN}$) of the electrical insulating material and the width ($W_{AM}$) of the amorphous alloys ($W_{IN}/W_{AM}$) is $0.5 \leqq W_{IN}/W_{AM} < 1$ have a large cooling effect and a small temperature rise and therefore they are preferred. As can be seen from FIGS. 5 and 6, FIG. 6 wherein magnetic cores comprising the amorphous alloy ribbons having a thickness of 15 μm and the electrical insulating material having a thickness of 2 μm were used i.e., magnetic cores having a large ratio of the thickness of the magnetic material ribbon to the thickness of the electrical insulating material have a large influence of the difference in width of the materials on cooling characteristic as compared with FIG. 5 wherein magnetic cores comprising the amorphous alloy ribbons having a thickness of 16 μm and the electrical insulating material having a thickness of 6 μm were used. It can be understood from FIG. 6 that, in the case of the magnetic cores having a large ratio of the thickness of the magnetic ribbons to the thickness of the electrical insulating material, the more approximate the width of the electrical insulating material is to the width of the magnetic material ribbon, the more excellent the cooling characteristic.

The reason why the temperature rise of the magnetic cores is large at $W_{IN}/W_{AM} < 0.5$ is thought due to heat generation by short-circuit between the amorphous alloy ribbons. Heat generation at $W_{IN}/W_{AM} \geqq 1$ is thought due to the reduction of heat removal property by the electrical insulating material projecting from the amorphous alloy ribbons.

Figure 7:
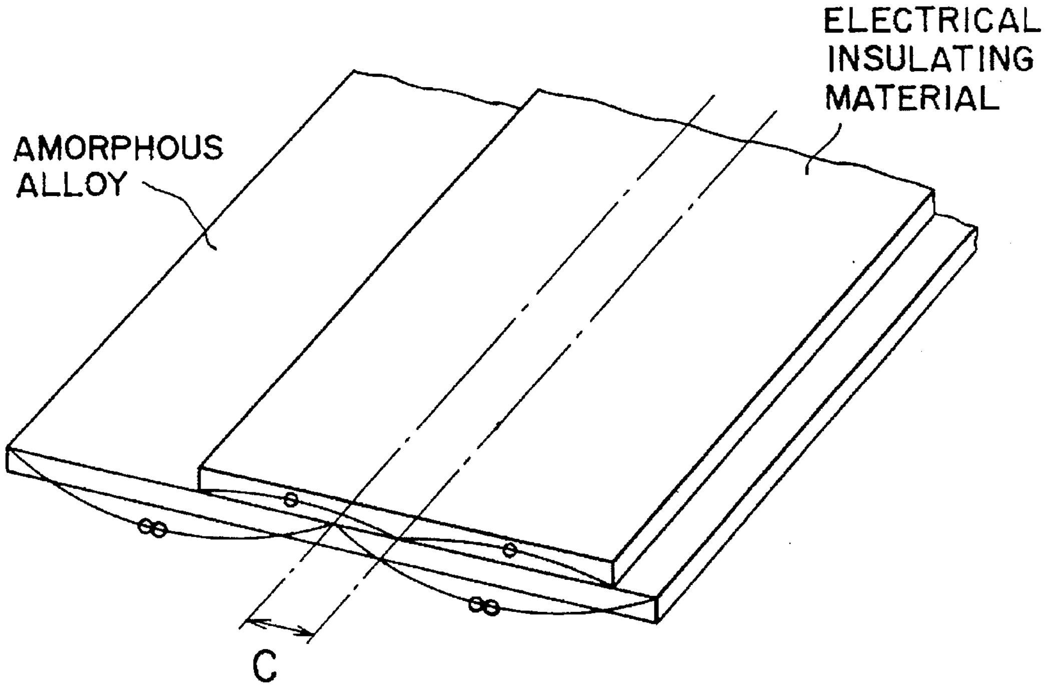
FIG. 7 is a perspective view showing the disposition relationship between amorphous alloys and electrical insulating materials.

In the amorphous alloys and the electrical insulating material used in Example 3, the distance C between the centerline of the amorphous alloys in a width direction and the centerline of the electrical insulating material in a width direction (see FIG. 7) was varied to prepare magnetic cores, and they were used in a KrF excimer laser system having an equivalent circuit of FIG. 3. In this case, the temperature rise of the magnetic cores was measured. The results are shown in FIG. 8.

In Examples and Comparative Examples described above, the centerline of the magnetic material ribbon and the centerline of the electrical insulating material coincide with.

In this case, an oil-cooled structure was formed wherein 5 magnetic cores were in $L_{S1}$ of FIG. 3. $C_{11}$=20 nF, $C_{21}$=16 nF, $C_{31}$=14 nF, $V_0$=30 kV and repetitive frequency=1 kHz.

Figure 8:
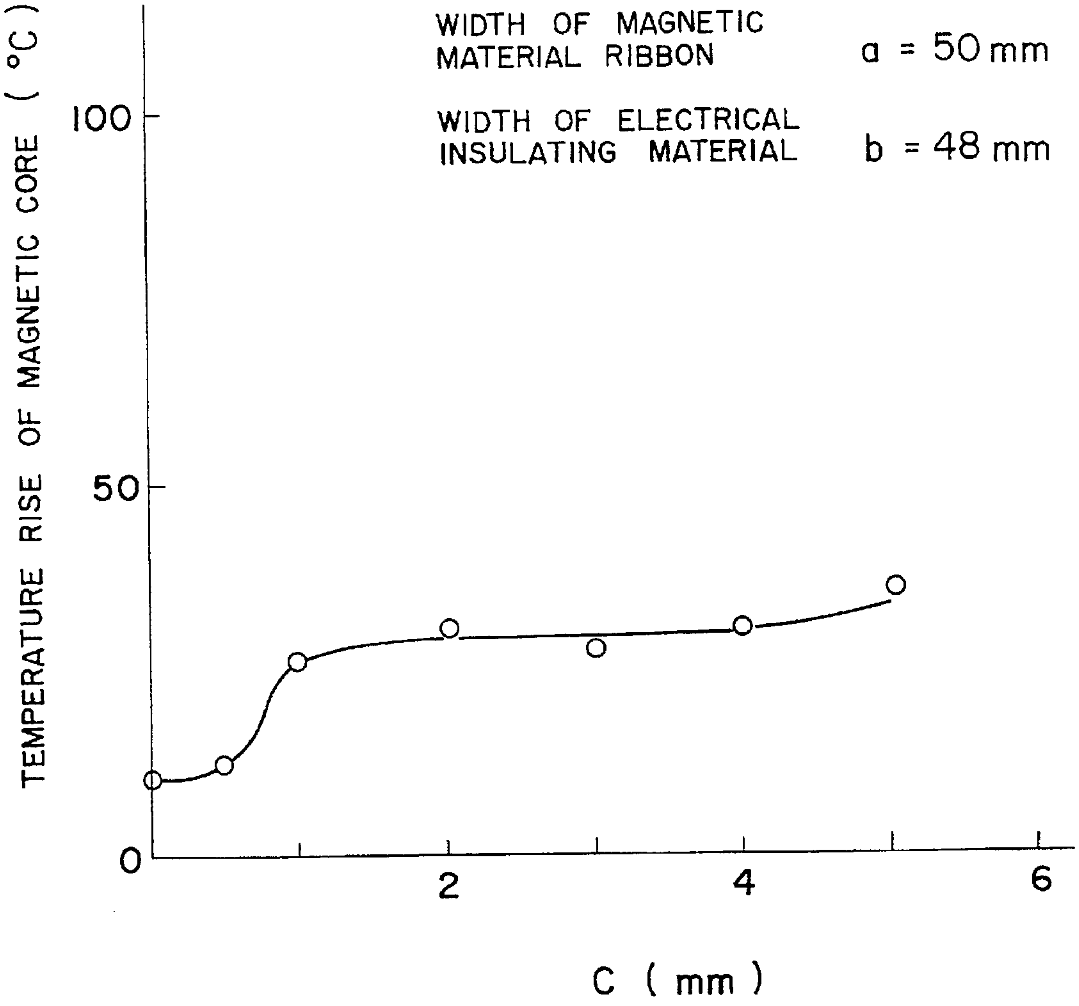
FIG. 8 is a graph showing the relationship between the distance C shown in FIG. 7 and the temperature rise of magnetic cores.

As can be seen from FIG. 8, when the one edges of the electrical insulating material in a width direction coincides with the one edges of the magnetic material ribbon in a width direction or projects therefrom, the temperature rise of the magnetic core is increased.

Accordingly, both edges of the electrical insulating material which do not project from the magnetic material ribbon are preferred from the standpoint of the contact area of the magnetic material ribbon to a coolant.

Industrial Applicability

The magnetic cores of the present invention exhibit small temperature rise of the magnetic cores in use and a large cooling effect and therefore they are effective for magnetic cores used in a large electric power such as magnetic cores for high output pulse.

TABLE 1

| | Magnetic Material Ribbon | | | Electrical Insulating Material | | | Temperature |
|---|---|---|---|---|---|---|---|
| | Composition (at. %) | Width (mm) | Thickness (μm) | Material | Width (mm) | Thickness (μm) | Rise (°C.) |
| Ex. 1 | $(Co_{0.94}Fe_{0.06})_{70}Ni_3Nb_1Si_{11}B_{15}$ | 50 | 16 | Polyester Film | 49 | 6 | 18 |
| Comp. Ex. 1 | " | " | " | " | 54 | " | 70 |
| Ex. 2 | " | 11 | 16 | " | 7 | 6 | 25 |
| Comp. Ex. 2 | " | " | " | " | 15 | " | 80 |
| Ex. 3 | $(Co_{0.94}Fe_{0.06})_{72}Nb_1Si_{14}B_{13}$ | 50 | 15 | Polyimide Film | 48 | 7.5 | 10 |
| Comp. Ex. 3 | " | " | " | " | 53 | " | 45 |
| Ex. 4 | $Fe_{78}Si_9B_{13}$ | 25 | 20 | " | 24.5 | 7.5 | 25 |
| Comp. Ex. 4 | " | " | " | " | 25 | " | 77 |
| Ex. 5 | $(Fe_{0.79}Co_{0.21})_{85}Si_1B_{14}$ | 25 | 15 | Polyester Film | 24 | 2 | 30 |
| Comp. Ex. 5 | " | " | " | " | 25 | 2 | 50 |
| Ex. 6 | $Fe_{73.5}Cu_1Nb_3Si_{13.5}B_9$ | 25 | 18 | Polyimide Film | 22 | 12 | 23 |
| Comp. Ex. 6 | " | " | " | " | 27 | " | 65 |
| Ex. 7 | $(Co_{0.94}Fe_{0.06})_{72}Nb_1Si_{14}B_{13}$ | 15 | 17 | Polyester Film | 14.5 | 4 | 15 |
| Comp. Ex. 7 | " | " | " | " | 16 | " | 52 |

We claim:

1. A magnetic core, formed by laminating or winding a magnetic material ribbon and an electrical insulating ribbon, said magnetic core having the relationship of $0.5a \leqq b < a$ in which the width of said magnetic material ribbon is "a", and the width of said electrical insulating ribbon is "b", said magnetic material ribbon and said electrical insulating ribbon being disposed such that both edges of the magnetic material ribbon project from respective edges of the electrical insulating ribbon in a width direction, and wherein at least an edge of said magnetic material ribbon is shaped to contact a coolant.

2. The magnetic core according to claim 1, wherein the relationship between the width "a" of said magnetic material ribbon and the width "b" of said electrical insulating ribbon has the relationship of $0.9\ a \leqq b < a$.

3. The magnetic core according to claim 1, wherein the relationship between the width "a" of said magnetic material ribbon and the width "b" of said electrical insulating ribbon has the relationship of $0.95\ a \leqq b < a$.

4. The magnetic core according to claim 1, wherein said magnetic material ribbon and said electrical insulating ribbon are disposed such that the centerline of the magnetic material ribbon and the centerline of said electrical insulating ribbon substantially coincide.

5. The magnetic core according to claim 1, wherein said magnetic material ribbon is composed of an amorphous alloy represented by the following general formula:

$$Fe_{100-y}X_y$$

$$14 \leqq y \leqq 21 \text{[at. \%]}$$

wherein X is one or more elements selected from the group consisting of Si, B, P, C and Ge.

6. The magnetic core according to claim 1, wherein said magnetic material ribbon is composed of an amorphous alloy represented by the following general formula:

$$(Fe_{1-x}M_x)_{100-y}X_y$$

$$0 < x \leqq 0.4$$

$$14 \leqq y \leqq 21 \text{[at. \%]}$$

wherein M is one or two elements selected from the group consisting of Co and Ni, and X is one or more elements selected from the group consisting of Si, B, P, C and Ge.

7. The magnetic core according to claim 1, wherein said magnetic material ribbon is composed of an amorphous alloy represented by the following general formula:

$$(Co_{1-x}Fe_x)_{100-z}(Si_{1-y}B_y)_z$$

$$0.02 \leqq x \leqq 0.1$$

$$0.3 \leqq y \leqq 0.9$$

$$20 \leqq z \leqq 30 \text{[at. \%]}.$$

8. The magnetic core according to claim 1, wherein said magnetic material ribbon is composed of an Fe-base soft magnetic alloy represented by the following general formula:

$$(Fe_{1-a}M_a)_{100-x-y-z-\alpha-\beta-\gamma}Cu_xSi_yB_zM^{-}_{\alpha}M^{--}_{\beta}X_{\gamma}$$

$$0 \leqq a \leqq 0.5$$

$$0.1 \leqq x \leqq 3$$

$$0 \leqq y \leqq 30$$

$$0 \leqq z \leqq 25$$

$$0 \leqq y+z \leqq 35$$

$$0 \leqq \alpha \leqq 30$$

$$0 \leqq \beta \leqq 10$$

$$0 \leqq \gamma \leqq 10$$

wherein M is one or two elements selected from the group consisting of Co and Ni, and $M^{-}$ is one or more elements selected from the group consisting of Nb, W, Ta, Zr, Hf, Ti and Mo, $M^{--}$ is one or more elements selected from the group consisting of V, Cr, Mn, Al, platinum group metals, Sc, Y, rare earth elements, Au, Zn, Sn and Re, and X is one or more elements selected from the group consisting of C, Ge, P, Ga, Sb, In, Be and As and wherein at least 50% of the texture is composed of fine grains, and the grains have a maximum grain size of not more than 500 Angstroms.

9. The magnetic core according to claim 6, wherein said magnetic material ribbon is composed of an amorphous alloy in which at least 5 at. % of one or more elements selected from the group consisting of Ti, Ta, V, Cr, Mn, Cu, Mo, Nb and W are further added to said amorphous alloy.

10. The magnetic core according to claim 7, wherein said magnetic material ribbon is composed of an amorphous alloy in which at least 5 at. % of one or more elements selected from the group consisting of Ti, Ta, V, Cr, Mn, Cu, Mo, Nb and W are further added to said amorphous alloy.

11. A magnetic core comprising:

a magnetic material ribbon and an electrical insulating ribbon in alternating layers, wherein the width of said magnetic material ribbon is "a" and the width of said electrical insulating ribbon is "b";

said magnetic core satisfying the relationship of $0.5\,a \leqq b < a$;

said magnetic material ribbon and said electrical insulating ribbon being disposed in said alternating layers so that both edges of the magnetic material ribbon project from corresponding edges of the electrical insulating ribbon in a width direction, at least one edge of said magnetic material ribbon being shaped to contact a coolant.

12. The magnetic core according to claim 11, wherein the relationship between the width "a" of said magnetic material ribbon and the width "b" of said electrical insulating ribbon has the relationship of $0.9\,a \leqq b < a$.

13. The magnetic core according to claim 11, wherein the relationship between the width "a" of said magnetic material ribbon and the width "b" of said electrical insulating ribbon has the relationship of $0.95\,a \leqq b < a$.

14. A pulse generator comprising:

a magnetic core having a magnetic material ribbon and an electrical insulating ribbon in alternating layers, wherein the width of said magnetic material ribbon is "a" and the width of said electrical insulating ribbon is "b";

said magnetic core satisfying the relationship of $0.5a \leqq b < a$;

said magnetic material ribbon and said electrical insulating ribbon being disposed in said alternating layers so that both edges of the magnetic material ribbon project from corresponding edges of the electrical insulating ribbon in a width direction, at least one edge of said magnetic material ribbon being shaped to contact a coolant.

15. A transformer comprising:

a magnetic core having a magnetic material ribbon and an electrical insulating ribbon in alternating layers, wherein the width of said magnetic material ribbon is "a" and the width of said electrical insulating ribbon is "b";

said magnetic core satisfying the relationship of $0.5a \leqq b < a$;

said magnetic material ribbon and said electrical insulating ribbon being disposed in said alternating layers so that both edges of the magnetic material ribbon project from corresponding edges of the electrical insulating ribbon in a width direction, at least one edge of said magnetic material ribbon being shaped to contact a coolant.

16. An electric power system comprising:

a magnetic core having a magnetic material ribbon and an electrical insulating ribbon in alternating layers, wherein the width of said magnetic material ribbon is "a" and the width of said electrical insulating ribbon is "b";

said magnetic core satisfying the relationship of $0.5a \leqq b < a$;

said magnetic material ribbon and said electrical insulating ribbon being disposed in said alternating layers so that both edges of the magnetic material ribbon project from corresponding edges of the electrical insulating ribbon in a width direction, at least one edge of said magnetic material ribbon being shaped to contact a coolant.

* * * * *